Sept. 11, 1923.
P. HARDER
FOLDING BOX
Filed Feb. 11, 1921    2 Sheets-Sheet 1
1,467,724
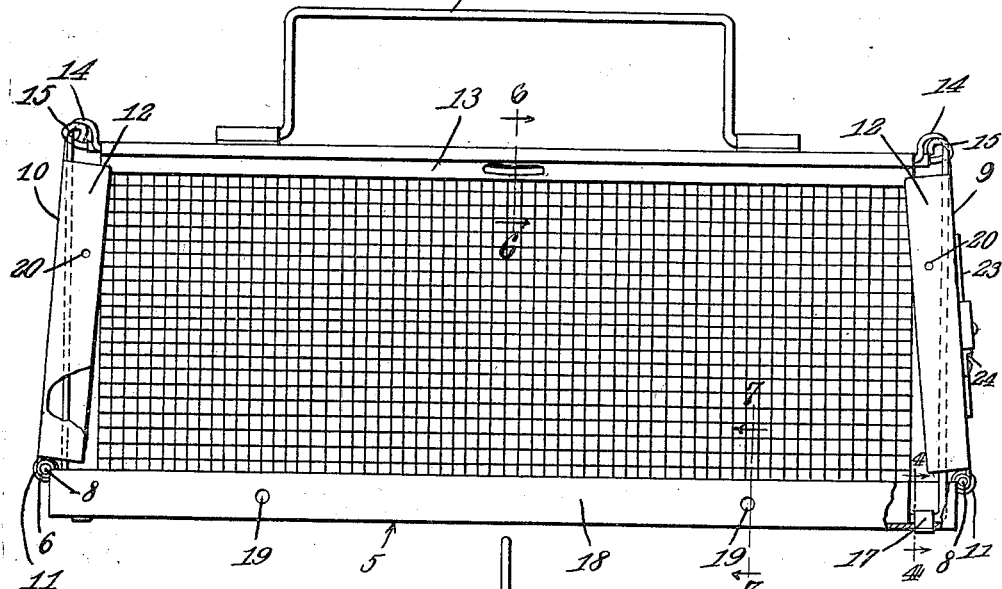
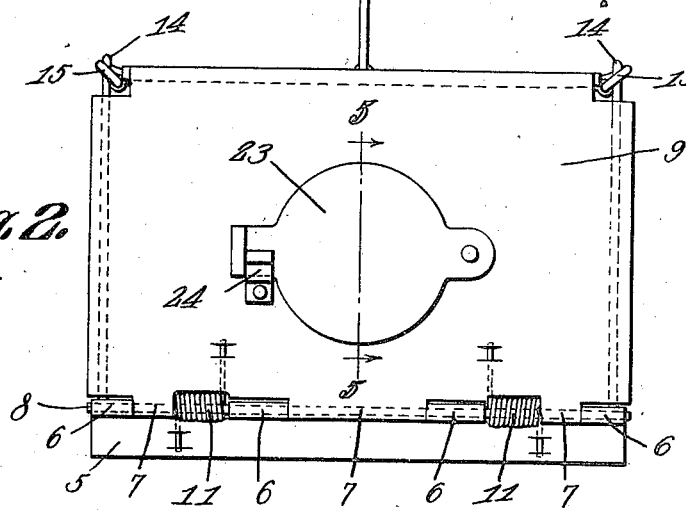
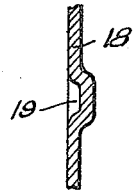
P. Harder, Inventor

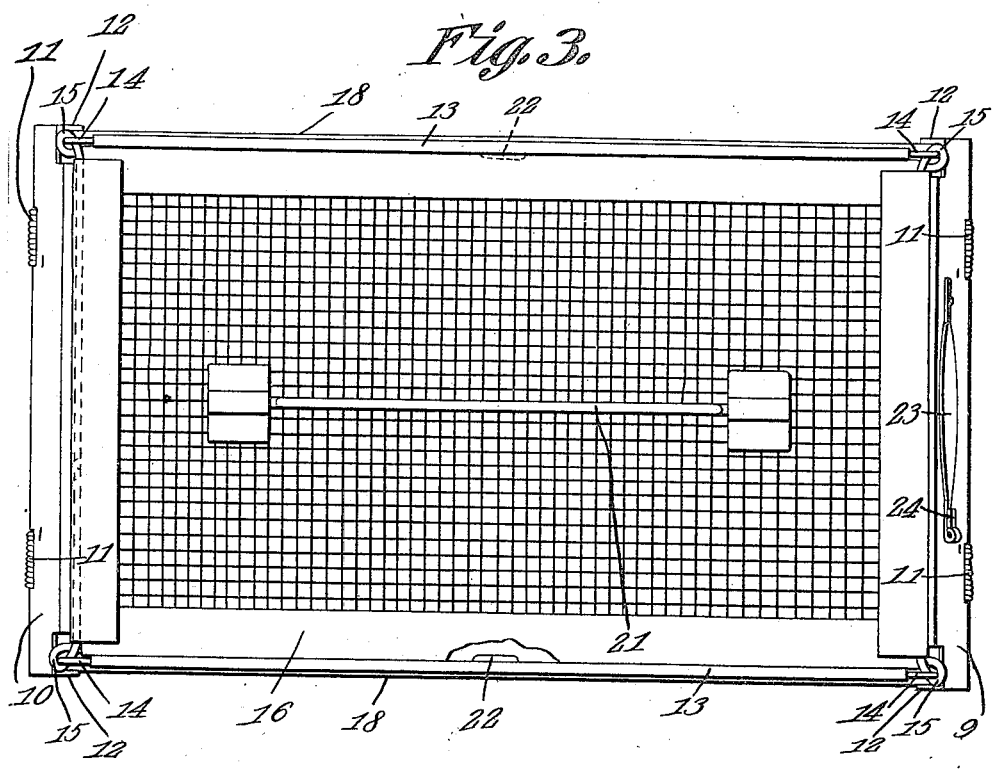

Patented Sept. 11, 1923.

1,467,724

UNITED STATES PATENT OFFICE.

PAUL HARDER, OF RED WING, MINNESOTA.

FOLDING BOX.

Application filed February 11, 1921. Serial No. 444,172.

*To all whom it may concern:*

Be it known that I, PAUL HARDER, a citizen of the United States, residing at Red Wing, in the county of Goodhue and State of Minnesota, have invented a new and useful Folding Box, of which the following is a specification.

This invention relates to folding frog or bait boxes, and more particularly to a box of this character to be used for housing live frogs or bait, the primary object of the invention being to provide a box which will preserve the life of the frogs or bait contained therein, and at the same time hold them captive.

A further object of the invention is to provide a device of this character which may be dropped into the water, and if desired held therein, to permit water to circulate therethrough.

A still further object of the invention is to provide a box which may be folded into a small and compact article, and one which may be carried in the usual fishing kit or pocket of the user.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view of a bait box constructed in accordance with the present invention.

Figure 2 is an end elevational view of the same.

Figure 3 is a plan view of the bait box.

Figure 4 is a sectional view taken on line 4—4 of Figure 1.

Figure 5 is a sectional view taken on line 5—5 of Figure 2.

Figure 6 is a sectional view taken on line 6—6 of Figure 1. Figure 7 is a sectional view taken on line 7—7 of Figure 1.

Referring to the drawings in detail, the box includes a base or bottom portion 5, which is rectangular in formation, and is provided with hinged sections 6 cooperating with the hinged sections 7 for receiving the pin 8 that connects the end sections 9 and 10 respectively, to the base, there being provided a spring 11 adjacent to each end of the pin, and coiled therearound, the ends of the springs being connected with the end sections 9 and 10 associated therewith, and the bottom 5 for normally urging the sections 9 and 10 inwardly towards the base.

The end sections 9 and 10 have their side edges extending inwardly as indicated at 12 so that they will embrace portions of the hinged side members 13 which also form part of the box.

Each of these side members 13 includes a wire frame covered with wire mesh material, the ends of the frames being disposed in spaced relation with the wire mesh material. Each wire frame is provided with a curved portion 14 formed at the upper corners thereof to provide pockets for the loop members 15 formed at the respective corners of the top section 16, and as shown, the upper corners of the end sections 9 and 10 are cut away to receive the loop members 15, the lower edges of the cut out portions forming abutments for the lower edges of the loop members to restrict movement of the top section 16 when the box is in its extended position.

The loop members 15 are formed at the corners of the top section, the top section being formed of a wire frame rectangular in shape, to which frame is secured the wire mesh material to permit fluid to pass therethrough. Wire mesh material also has connection with the frames of the side members, the ends of the wire mesh material being spaced from the ends of the wire frame to provide clearances for the loop members 15 which are looped around the ends of the wire frame and designed to move longitudinally thereof, when the box is being moved from either its folded position or its extended position.

Secured to the bottom 5 of the box at points adjacent to the ends thereof, are the hinge members 17, which embrace portions of the wire frame forming the side members as indicated more clearly by Figure 4 of the drawings, whereby the side members may be folded inwardly, it being understood that the loop members 15 are bent slightly upwardly to permit of this movement.

Extending upwardly from the bottom portion 5 are the flanges 18 in which are provided depressions 19 adapted to accommodate the enlargements 20 extending inwardly from the inwardly extending portions 12 of the end sections 9 and 10, when the box is in its folded position, thereby insuring against the end sections moving from their folded positions.

Secured to the top section 16 is a handle member 21 by means of which the top section will be raised when the sections of the box move to their extended position, and in order that the top section may be retained in such position, lugs 22 are provided adjacent the upper edges of the side members, and provide rests for the top section.

Formed in the end section 9 is a suitable opening to permit frogs or fish to be inserted in the box, the opening being closed however by means of the hinged closure 23, which is held in its closed position by the keeper 24.

From the foregoing it is obvious that by forcing the top section 16 downwardly into close engagement with the bottom 5, the side members may be folded inwardly over the top section 16, whereupon the end sections 9 and 10 may be folded inwardly over the side members and top section to permit the box to be easily carried by the user.

When the box is to be brought into use, it is only necessary to swing the end sections outwardly, and raise the top section by means of the handle 21, which movement moves the side members to their vertical positions. The top section now rests on the lugs 22, while the loop members 13 formed at the respective corners thereof, rest on the upper edges of the cut out portions formed in the end sections 9 and 10.

It might be further stated that when the box is in its extended position, frogs or live bait may be placed in the box and submerged in water thus insuring the life of the bait or frogs.

Having thus described the invention, what is claimed as new is:—

1. In a folding box, a bottom member, having upwardly extending side and end flanges, side members hingedly connected to the bottom and adapted to contact with the flanges to hold the side members in an upright position, end members hingedly connected to the end flanges adjacent to the upper edges thereof, said end members having inwardly extending side edges adapted to embrace portions of the side members to restrict lateral movement of the side members, and a top section adapted to move between the side and end members to hold them against movement.

2. In a folding box, a bottom member, side members, each of the side members including a wire frame, wire mesh material secured to the wire frame, the ends of the wire mesh material being disposed in spaced relation with the ends of the wire frame to provide guiding members, a top section having loop members formed at the ends thereof, and adapted to embrace portions of the guiding members of the frame to secure the top sections thereto, means carried by the side members and contacting with the top section for securing the top section to the limit of its upward movement, and end members adapted to embrace portions of the side members to support the side members in their upright positions.

In testimony that I claim the foregoing as my own, I have hereto affixed my signature in the presence of two witnesses.

PAUL HARDER.

Witnesses:
J. A. NONSTAD,
C. S. DANA.